United States Patent
Ishikawa

(10) Patent No.: US 8,482,632 B2
(45) Date of Patent: *Jul. 9, 2013

(54) IMAGING APPARATUS HAVING TEMPORARY RECORDING MODE AND DIRECT RECORDING MODE

(75) Inventor: Hiroto Ishikawa, Osaka (JP)

(73) Assignee: Sony Corporation, Tokyo (JP)

(*) Notice: Subject to any disclaimer, the term of this patent is extended or adjusted under 35 U.S.C. 154(b) by 63 days.

This patent is subject to a terminal disclaimer.

(21) Appl. No.: 13/180,989

(22) Filed: Jul. 12, 2011

(65) Prior Publication Data

US 2011/0267527 A1 Nov. 3, 2011

Related U.S. Application Data

(63) Continuation of application No. 12/177,242, filed on Jul. 22, 2008, now Pat. No. 8,004,581.

(30) Foreign Application Priority Data

Sep. 5, 2007 (JP) ................. 2007-230144

(51) Int. Cl.
*H04N 5/76* (2006.01)
*H04N 5/222* (2006.01)

(52) U.S. Cl.
USPC .................... 348/231.2; 348/333.11

(58) Field of Classification Search
USPC .............. 348/231.99, 231.2, 231.1, 333.11
See application file for complete search history.

(56) References Cited

U.S. PATENT DOCUMENTS

| | | | |
|---|---|---|---|
| 5,956,084 A | 9/1999 | Moronaga et al. | |
| 6,249,316 B1 | 6/2001 | Anderson | |
| 6,930,712 B1 | 8/2005 | Higuchi et al. | |
| 7,039,780 B2 | 5/2006 | Taussig et al. | |
| 7,471,318 B2* | 12/2008 | Butterworth | 348/231.99 |
| 7,502,055 B2 | 3/2009 | Jeon et al. | |
| 8,159,560 B2* | 4/2012 | Oyama | 348/231.2 |
| 2003/0117505 A1 | 6/2003 | Sasaki et al. | |
| 2003/0123078 A1 | 7/2003 | Kazami | |
| 2005/0149571 A1 | 7/2005 | Jeon et al. | |
| 2005/0211780 A1 | 9/2005 | Tanaka | |
| 2006/0023076 A1 | 2/2006 | Jeoung | |
| 2006/0152599 A1 | 7/2006 | Yokonuma et al. | |
| 2006/0215041 A1 | 9/2006 | Kobayashi | |

FOREIGN PATENT DOCUMENTS

| | | |
|---|---|---|
| JP | 2002-118781 A | 4/2002 |
| JP | 2004-334626 A | 11/2004 |
| JP | 2007-36582 | 2/2007 |

* cited by examiner

*Primary Examiner* — John Villecco
(74) *Attorney, Agent, or Firm* — Oblon, Spivak, McClelland, Maier & Neustadt, L.L.P.

(57) ABSTRACT

An imaging apparatus includes: an imaging device acquiring a captured image on a subject; a display section; setting means for setting whether to make effective a temporary recording mode in which the captured image is temporarily recorded in a first storage section; if the temporary recording mode is effective, display control means for playback displaying the captured image recorded in the first storage section from when the temporary recording mode has been effective on the display section in response to an instruction operation of a user; and recording control means for recording an image specified by the user from the playback-displayed captured images in a second storage section as an image to be saved.

8 Claims, 7 Drawing Sheets

IMAGING APPARATUS HAVING TEMPORARY RECORDING MODE AND DIRECT RECORDING MODE

CROSS REFERENCES TO RELATED APPLICATIONS

This application is a continuation of and claims the benefit of priority under 35 U.S.C. §120 from U.S. Ser. No. 12/177,242, filed Jul. 22, 2008, and claims the benefit of priority under 35 U.S.C. §119 from Japanese Patent Application JP2007-230144 filed in the Japanese Patent Office on Sep. 5, 2007. The entire contents of U.S. Ser. No. 12/177,242 and JP2007-230114 are incorporated herein by reference.

BACKGROUND OF THE INVENTION

1. Field of the Invention

The present invention relates to an imaging apparatus.

2. Description of the Related Art

There are digital cameras having a playback-mode function in which a shot image (captured image) is automatically saved in a recording device, such as a memory card, etc., and the captured image saved in the recording device is playback displayed on a display section after completion of the shooting.

In such a digital camera, it is possible for a user to delete (erase) unnecessary images from the captured images saved in the recording device while viewing images being playback displayed in the playback mode. For example, Japanese Unexamined Patent Application Publication No. 2007-36582 has proposed a technique in which information files, in a recording medium, selected as candidates for deletion by the user's deletion operation are moved to a specified directory as deletion files, and the deletion files in the specified directory are deleted in accordance with a decrease in a recordable area of the recording medium in order to ensure the recordable area.

SUMMARY OF THE INVENTION

However, the deletion operation in the above-described playback mode is often carried out when the recordable area of the recording medium becomes small with an increase in the storage of captured images. In this case, it has become troublesome for the user to perform deletion operation for setting unnecessary images from a large volume of images saved in the recording device.

Also, when the capacity of the recording device increases, the number of images that can be saved in the recording device increases. Thus, the deletion operation becomes more troublesome than ever before.

It is desirable to provide an imaging apparatus capable of reducing deletion operations for setting unnecessary images from the images saved in a recording device.

According to an embodiment of the present invention, there is provided an imaging apparatus including: an imaging device acquiring a captured image on a subject; a display section; setting means for setting whether to make effective a temporary recording mode in which the captured image is temporarily recorded in a first storage section; if the temporary recording mode is effective, display control means for playback displaying the captured image recorded in the first storage section from when the temporary recording mode has been effective on the display section in response to an instruction operation of a user; and recording control means for recording an image specified by the user from the playback-displayed captured images in a second storage section as an image to be saved.

Also, according to another embodiment of the present invention, there is provided an imaging apparatus including: an imaging device acquiring a captured image on a subject; a display section; recording control means for temporarily recording the captured image in a first storage section; display control means for playback displaying a plurality of captured images stored in the first storage section on the display section in response to a user's instruction operation, wherein the recording control means has means for recording an image specified by the user from the playback-displayed captured images in a second storage section as an image to be saved.

By the present invention, the captured images recorded in the first storage section from when the temporary recording mode has been effective are playback displayed on the display section, and the captured images specified by the user from the images playback displayed are recorded in the second recording section as images to be saved. Thus, the images to be saved are saved in the second recording section. Accordingly, it is possible to reduce troublesome operations of deleting unnecessary images from the images saved in the second recording section.

DESCRIPTION OF THE PREFERRED EMBODIMENTS

In the following, a description will be given of an embodiment of the present invention with reference to the drawings.

1. First Embodiment 1.1 Configuration

Figure 1:
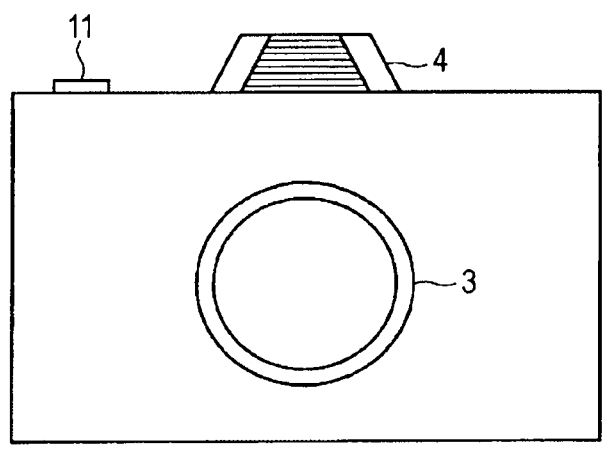
FIG. 1 is an outer view illustrating a configuration of an imaging apparatus according to a first embodiment of the present invention.
Figure 2:
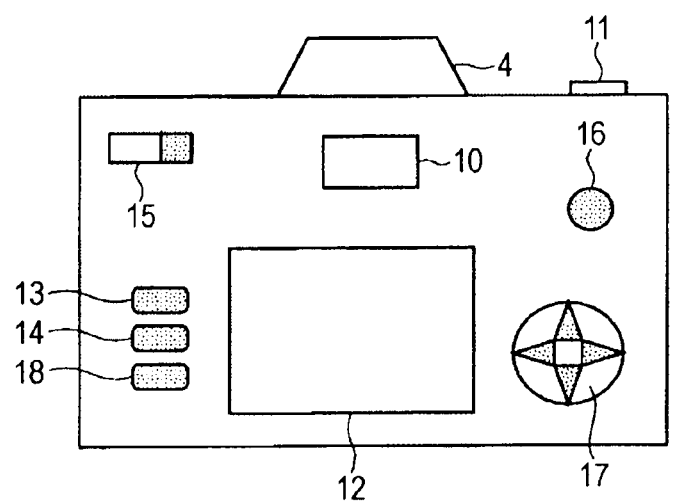
FIG. 2 is an outer view illustrating a configuration of the imaging apparatus according to the first embodiment of the present invention.

FIGS. 1 and 2 are outer views illustrating a configuration of an imaging apparatus 1A according to a first embodiment of the present invention. Here, FIG. 1 is a front outer view of the imaging apparatus 1A, and FIG. 2 is a rear outer view of the imaging apparatus 1A.

The imaging apparatus 1A is configured as a digital camera, for example, and has a capture lens 3 on the front face thereof (refer to FIG. 1).

The capture lens 3 mainly includes a group of lenses, an aperture, etc. A group of lenses include a focus lens which changes a focal position by being moved in an optical axis direction, etc.

Also, the imaging apparatus 1A is provided with a release button 11 for instructing a start of exposure and a flash 4 on the top panel thereof.

The release button 11 is a two-step detection button capable of detecting two states: a halfway pressed state (S1 state), and a fully pressed state (S2 state). When the release button 11 is halfway pressed to go into the S1 state, a preparatory operation (for example, auto focus (AF) control operation by the phase difference and auto exposure (AE) control operation, etc.) for acquiring a recording still image (actual captured image) on a subject is performed. Also, when the release button 11 is further pressed to go to the S2 state, the shooting operation (the exposure operation on the subject image using an imaging device (described below), and then a series of operations performing predetermined image processing on the image signal acquired by the exposure operation) of that actual shooting image is performed.

Also, the imaging apparatus 1A includes, on the back panel (refer to FIG. 2), a monitor 12, a viewfinder window 10, a main switch (power switch) 15, a menu button 16, a direction-selection key 17, a temporarily saved image playback button 13, and a save button 14.

More specifically, a monitor (also called a "display section") 12 is disposed substantially at the center on the back panel of the imaging apparatus 1A. The monitor 12 is constituted by a color-liquid-crystal display (LCD), for example. On the monitor 12, it is possible to display a menu screen for setting shooting conditions, etc., and to playback display the captured image recorded in the recording device 106 (FIG. 3), such as a memory card, etc.

A viewfinder window 10 is disposed at the upper part of the monitor 12. A subject image is led into the viewfinder window 10, and thus a photographer (also called a "user") can view the subject image to determine a picture composition by looking at the viewfinder window 10.

A main switch 15 is disposed at the upper left part of the monitor 12. The main switch 15 is a two-position slide switch. When the contact point is set to a left position, "OFF" position, the power is turned off, and when the contact point is set to a right position, "ON" position, the power is turned on.

A direction-selection key (cursor key) 17 is disposed at the right side of the monitor 12. This direction-selection key 17 has a circular operation button, and can detect a pressing operation in four directions, up, down, right, and left. In this regard, the direction-selection key 17 can also detect a pressing operation of a central push button (decision button) in addition to the pressing operation in the four directions described above.

A menu button 16 is disposed at the upper right part of the monitor 12. When the menu button 16 is pressed, a menu screen is displayed on the monitor 12, and the user is allowed to set a detailed operation (for example, an AF mode, a save method of captured images (image save method), etc.) of the imaging apparatus 1A in a shooting mode or a playback mode by a cooperative operation with the direction-selection key 17.

Here, a description will be given of an image save method of the imaging apparatus 1A. The imaging apparatus 1A has two modes for saving images. In one of the modes, all the captured image data is automatically saved in the recording device 106 (this mode is also called a "direct save mode"). In the other of the modes, captured image data is temporarily saved in a folder (also called a "temporary-save folder") of the image memory 103 (refer to FIG. 3), and the user is allowed to select images to be saved in the recording device 106 from a plurality of images stored by the temporary saving (this mode is also called a "temporary-save mode" or a "temporary-recording mode"). The user is allowed to specify either the direct save mode or the temporary-save mode by the menu operation to make one of them effective alternatively. In this regard, in either of the save modes described above, image data to be saved in the recording device 106 is stored in a folder specified by the user in advance.

At the left side of the monitor 12, a temporarily saved image playback button 13, a save button 14, and a display change button 18 are disposed.

The temporarily saved image playback button 13 is an instruction button for playback displaying the images saved in the temporary-save folder of the image memory 103 on the monitor 12.

Specifically, in a state of the temporary-save mode being effective, when the temporarily saved image playback button 13 is pressed, the captured image (also called a "temporarily saved image") saved in the temporary-save folder of the image memory 103 (refer to FIG. 3) is playback displayed on the monitor 12. In the playback displayed state, the user is allowed to select an image to be saved (also called a "save-target image") from the temporarily saved images displayed on the monitor 12 by operating the direction-selection key 17. Then, the user can save the save-target images in the recording device 106 by pressing the save button 14.

In this manner, it becomes possible for the user to select an image to be saved from the captured images at the user's arbitrary timing (desired timing), and to save the image in the recording device 106 in the shooting mode for carrying out shooting. By this means, it becomes possible for the user to avoid changing from the shooting mode to the playback mode after shooting, and performing troublesome operations for selecting images to be deleted (deletion target) from a large volume of images saved in the recording device 106.

The display change button 18 has a function of changing display modes of the monitor 12.

For example, if the display change button 18 is pressed in a state of playback displaying temporarily saved images on the monitor 12, the display mode of playback display is changed. More specifically, by pressing the display change button 18, etc., it is possible to change the display mode of the temporarily saved images on the monitor 12 among one-sheet playback (one-frame playback) displaying one piece of image on the monitor 12, index playback displaying nine sheets of images on the monitor 12 at once, a histogram (luminance) display displaying a histogram (luminance distribution) of the image on the monitor 12 along with an image, and an enlarged display displaying by enlarging a part of an image.

1.2. Function

Figure 3:
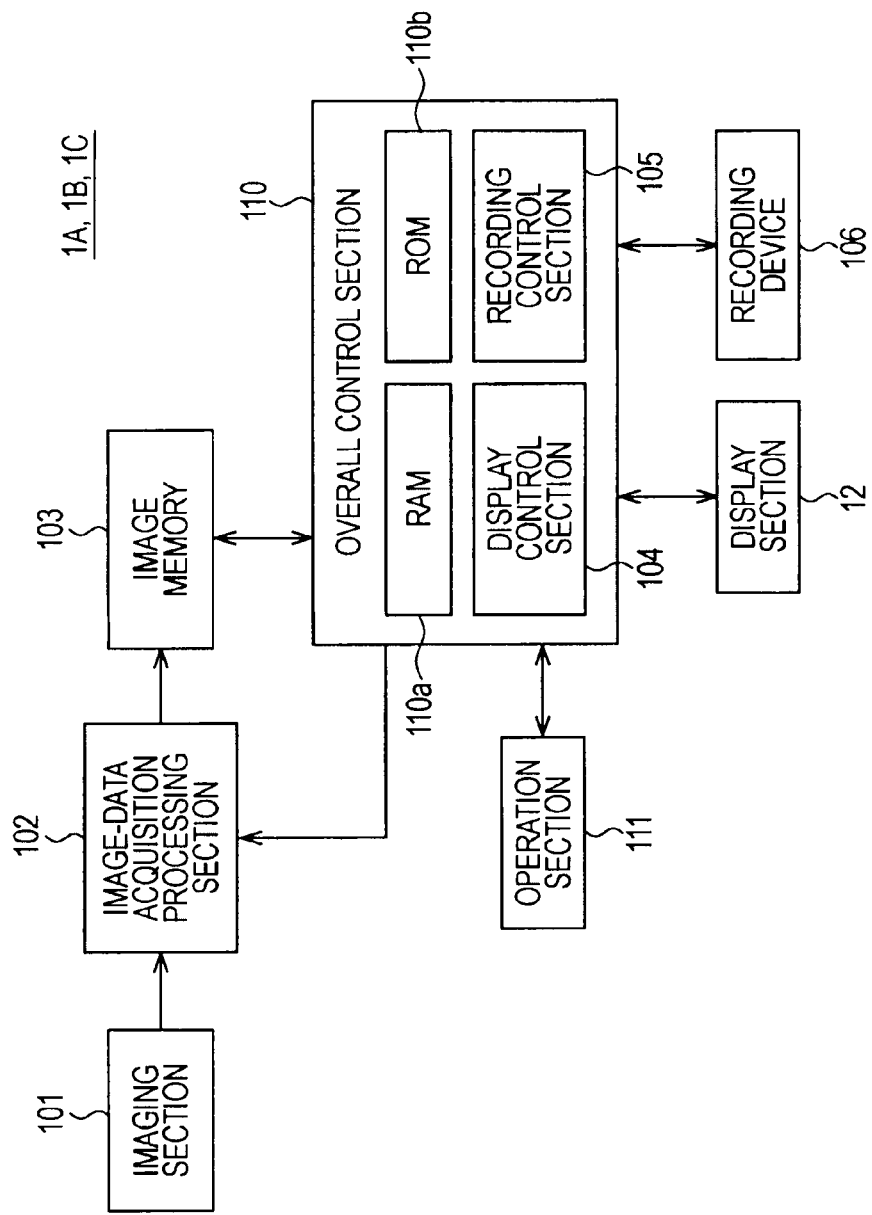
FIG. 3 is a block diagram illustrating a functional configuration of the imaging apparatus.

Next, a description will be given of an overview of the functions of the imaging apparatus 1A. FIG. 3 is a block diagram illustrating a functional configuration of the imaging apparatus.

As shown in FIG. 3, the imaging apparatus 1A includes an imaging section 101, an image-data acquisition processing section 102, an image memory 103, a removable recording device 106, an overall control section 110, an operation section 111, etc.

The operation section 111 includes various buttons including the release button 11 and the temporarily saved image playback button 13 (refer to FIG. 2), switches, and the like. The overall control section 110, etc., perform various operations in response to an input operation of the user on the operation section 111. For example, if the fully-pressed state of the release button 11 is detected, a shooting operation of the actual image is performed.

The imaging section 101 includes an optical sensor, such as an imaging device (CCD or CMOS), etc. The imaging device performs exposure (charge storage by photoelectric conversion) of a subject image formed on the photosensitive surface, and generates image signals of the subject image. Specifically, the imaging device is configured as a Bayer arrangement of color sensors (for example, CCDs), in which a plurality of pixels having a photodiode are disposed in a two-dimensional matrix, and a checkered arrangement of original-color transparent filters, namely R (red), G (green), and B (blue) filters, are individually disposed on the photosensitive surfaces of pixels. The imaging device converts the formed light image of the subject into analog electronic signals of individual color components, namely R (red), G (green), and B (blue).

An image-data acquisition processing section 102 has a function of acquiring an image signal from the imaging section 101 in response to an instruction operation of the user through the operation section 111 (more specifically, in response to a shooting instruction signal output from the overall control section by detecting the pressing operation of the release button 11), performing predetermined image processing, and acquiring the image data on the captured image.

The image memory 103 includes a nonvolatile memory, and has a capacity for storing image data of a plurality of frames. The image memory 103 has a function of temporarily storing the image data, which has been acquired by the image-data acquisition processing section 102 and has been subjected to predetermined processing.

The overall control section 110 is constituted by a microcomputer, and mainly includes a CPU, a RAM 110a, and a ROM 110b.

The overall control section 110 reads programs stored in the ROM 110b, and executes the programs on the CPU, thereby achieving various functions. In FIG. 3, a display control section 104 and a recording control section 105 represent the functions performed by executing the programs in the overall control section 110 as functional blocks.

The display control section 104 transfers, to the RAM 110a, the image data of the image to be displayed on the monitor 12 from the image memory 103 as a storage section or the recording device 106, and displays the image data on the display section 12 after performing necessary processing in response to the user's instruction operation input from the operation section 111.

Also, the recording control section 105 has a function of saving the image data in the image memory 103 or the recording device 106, and of deleting (erasing) the image data saved in the image memory 103 or the recording device 106.

Specifically, in a state of the direct-save mode being effective, the recording control section 105 reads the image data temporarily saved in the image memory 103 to the RAM 110a, performs predetermined processing, and then saves the image data in the recording device 106.

Also, in a state of the temporarily-save mode being effective, the recording control section 105 temporarily saves the image data on the captured image in the image memory 103, and saves the image data of the image (image to be saved) specified (selected) as a save target in the recording device 106 from the images in the image memory 103. Then, the recording control section 105 deletes the image data of the image not specified for the save target (also called as an "image not to be saved" or "unspecified image") from the image memory 103 at predetermined timing (for example, when the power to the imaging apparatus 1A is turned off).

1.3. Operation

Figure 4:
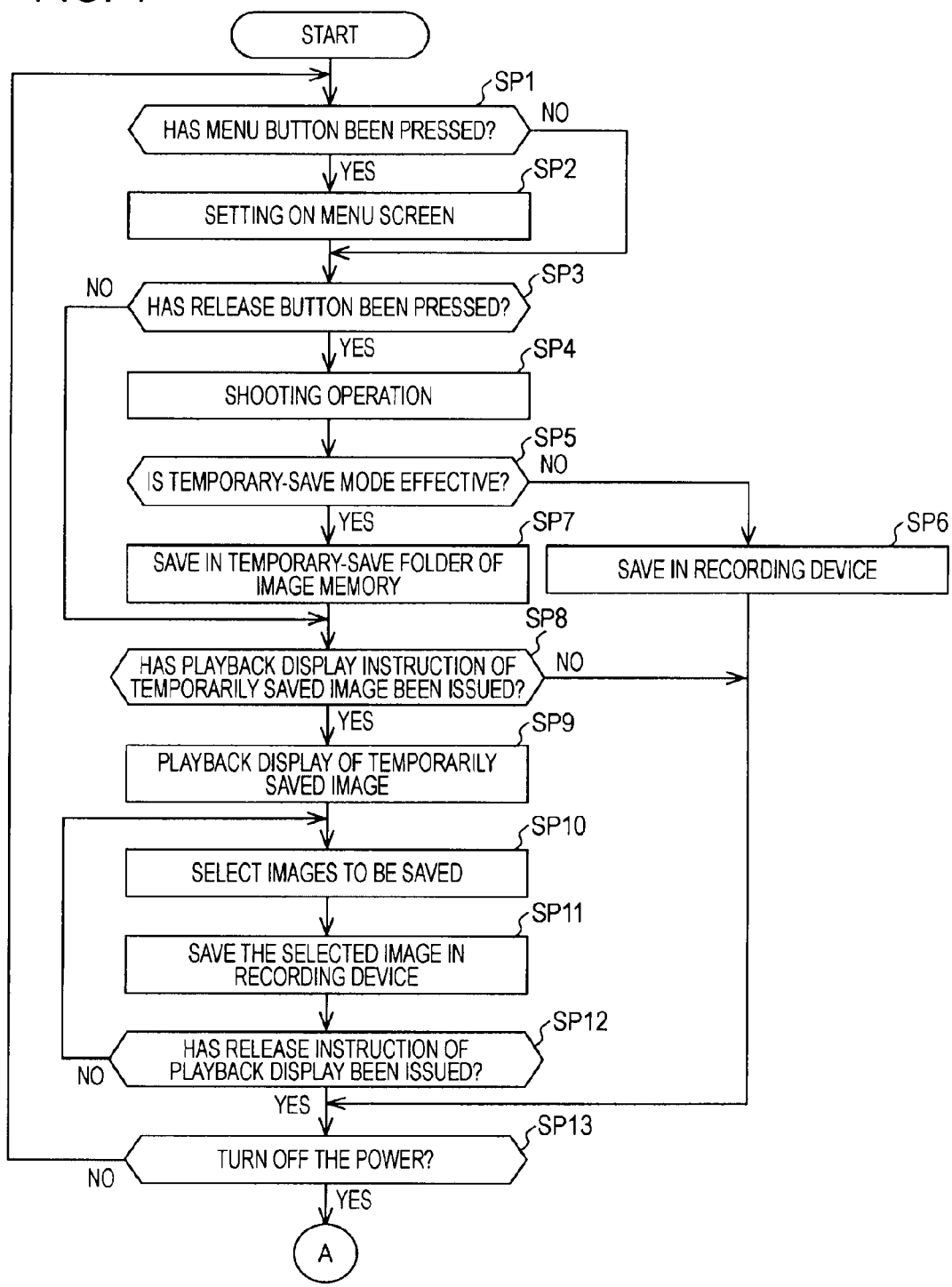
FIG. 4 is a flowchart illustrating an operation of the imaging apparatus.
Figure 5:
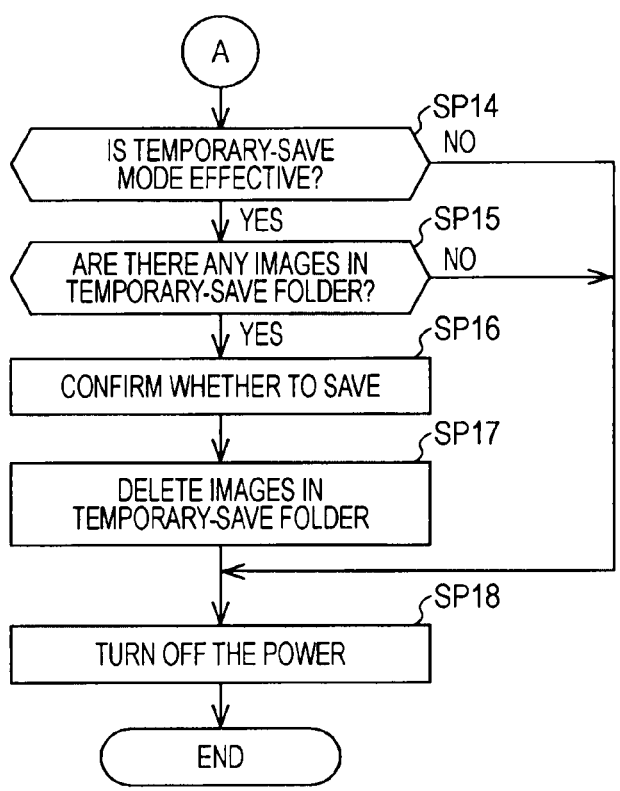
FIG. 5 is a flowchart illustrating an operation of the imaging apparatus.
Figure 6:
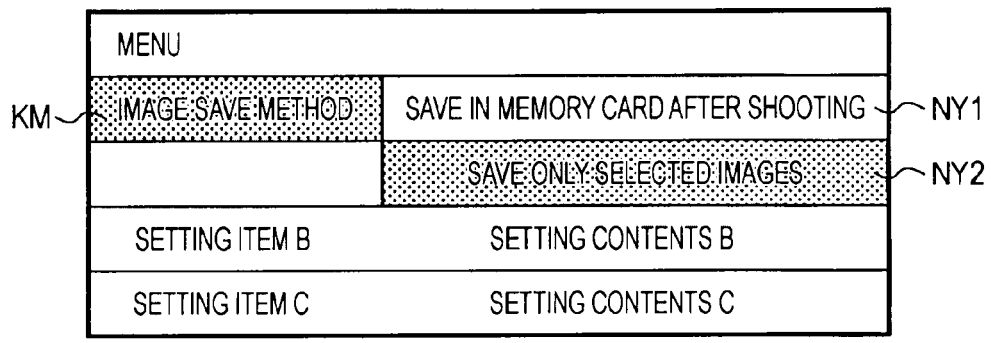
FIG. 6 is a diagram illustrating an example of a menu screen.
Figure 7:
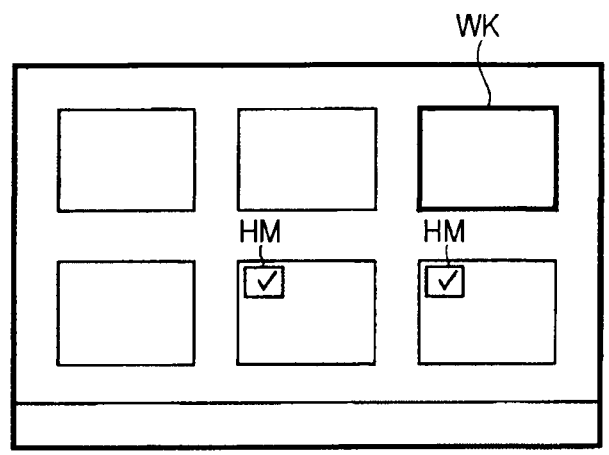
FIG. 7 is a diagram illustrating an example of a playback display screen.
Figure 8:
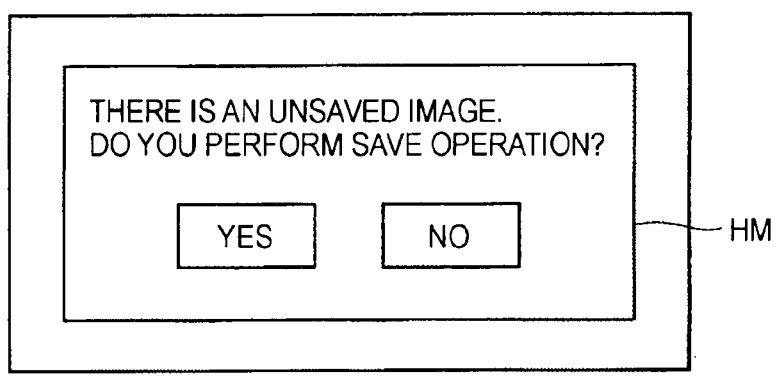
FIG. 8 is a diagram illustrating an example of a confirmation display.

Next, a description will be given of the operation of the imaging apparatus 1A. FIGS. 4 and 5 are flowcharts illustrating an operation of the imaging apparatus 1A. FIG. 6 is a diagram illustrating an example of a menu screen. FIG. 7 is a diagram illustrating an example of a playback display screen. FIG. 8 is a diagram illustrating an example of a confirmation display.

As shown in FIG. 4, when the power is turned on to the imaging apparatus 1A, in step SP1, a detection is made of whether the menu button 16 has been pressed. If the pressing operation of the menu button 16 has not been detected, the processing proceeds to step SP3. Else if the pressing operation of the menu button 16 has been detected, the processing proceeds to step SP3.

In step SP2, various settings on the menu screen are carried out. Specifically, when the pressing operation of the menu button 16 is detected (step SP1), a menu screen is display on the monitor 12. The user can perform settings of various operations of the imaging apparatus 1A on the menu screen by operating the direction-selection key 17.

For example, if the image save method is set to the temporary save mode, as shown in FIG. 6, "IMAGE SAVE METHOD" KM should be selected as a setting item, and "SAVE ONLY SELECTED IMAGES" NY2 should be selected as setting contents on the menu screen. On the other hand, if the image save method is set to the direct save mode, "SAVE IN MEMORY CARD AFTER SHOOTING" NY1 should be selected as setting contents of the image save method on the menu screen.

In step SP3, a detection is made of whether the release button 11 has been pressed. If the pressing operation of the release button 11 is not detected, the processing proceeds to step SP8. Else if the pressing operation of the release button 11 is detected, the processing proceeds to step SP4.

In step SP4, a shooting operation is performed. Specifically, if a halfway pressed state (S1 state) of the release button 11 is detected, the AF control operation, the AE control operation, etc., are performed. Furthermore, if a fully pressed state (S2 state) of the release button 11 is detected, the exposure operation on the subject image is performed by the imaging section 101. Then, the image signal acquired by the exposure operation is subjected to predetermined image processing by the image-data acquisition processing section 102, and is stored in the image memory 103.

In step SP5, a determination is made on whether the temporary save mode is set (effective). If the temporary save mode is not effective (if the direct save mode is effective), the processing proceeds to step SP6. In step SP6, the image data stored in the image memory 103 is converted into the recording image data by the recording control section 105, and is saved in the recording device 106.

On the other hand, in step SP5, if it is determined that the temporary save mode is effective, the processing proceeds to step SP7. In step SP7, the image data stored in the image memory 103 by the recording control section 105 is saved in the temporary-save folder of the image memory 103.

In step SP8, a determination is made on whether the playback display instruction on the image data saved in the temporary-save folder has been issued. If the playback display instruction by the pressing operation of the temporarily saved image playback button 13 is not detected, the processing proceeds to step SP13. If the playback display instruction by the pressing operation of the temporarily saved image playback button 13 is detected (if the pressing operation of the temporarily saved image playback button 13 has been performed), the processing proceeds to step SP9.

In step SP9, the temporarily saved image is playback displayed on the monitor 12 (refer to FIG. 7). Thus, on the monitor 12, the user is allowed to view the image captured during the period from the time when the temporary save mode has been effective to the time when the temporarily saved image playback button 13 is pressed (until the playback display instruction is detected).

In step SP10, the image to be saved is selected (specified) by a user's instruction operation using the direction-selection key 17, etc. Specifically, it is possible for the user to operate the direction-selection key 17 on the playback display screen shown in FIG. 7 to move a target frame WK among the images. Thereby, it is possible for the user to specify the image to be saved by pressing a decision button of the direction-selection key 17 in a state of placing the target frame WK on the image to be saved. A selection-confirmation display HM, which is visually distinguishable from a non-specified image (in FIG. 7, a check box with a check mark appears at the upper left of the image), is added to the image selected (specified) as an image to be saved (also called a "specified image" or "selected image").

In step SP11, the recording control section 105 transfers and saves the specified images to the recording device 106, and deletes the image data on the selected image in the temporary-save folder in response to the pressing of the save button 14.

In step SP12, a determination is made on whether a playback display instruction has been issued. Specifically, if a release instruction of playback display by the re-pressing operation, etc., of the temporarily saved image playback button 13 has not been detected, the processing proceeds to step SP10. Thereby, it becomes possible to continuously perform the save operation (from step SP10 to step SP12) of the captured images until a release instruction of playback display is issued. On the other hand, if the release instruction of playback display is detected, the processing proceeds to step SP13.

In step SP13, a determination is made on whether a turn-off-power instruction to the imaging apparatus 1A by the operation of the main switch 15 has been detected. If the turn-off-power instruction has not been detected (if the power-on state continues), the processing proceeds to step SP1. That is to say, in the imaging apparatus 1A, the processing from step SP1 to step SP13 is repeatedly performed until the turn-off-power instruction is detected.

On the other hand, if the turn-off-power instruction has been detected, the processing proceeds to step SP14.

In step SP14, a determination is made on whether the temporary save mode is set (effective) in the same manner as the above-described step SP5. If the temporary save mode is not effective, the processing proceeds to step SP18, and the power to the imaging apparatus 1A is turned off.

On the other hand, if it is determined that the temporary save mode is effective, the processing proceeds to step SP15. From step SP15 to step SP17, deletion processing of the image data left in the temporary-save folder (also called "deletion processing of left image data") is performed.

Specifically, in step SP15, a determination is made on whether there is image data in the temporary-save folder. If there is no image data, the processing proceeds to turn-off-power processing in step SP18. If there is image data, the processing proceeds to step SP16.

In step SP16, a confirmation (confirmation whether to save) is made to the user on whether to perform the save operation of the image data in the temporary-save folder. The save confirmation is performed, for example, by outputting a confirmation (warning) display HN as shown in FIG. 8 on the monitor 12. If the user has selected to perform save operation, the temporarily saved image in the temporary-save folder is displayed on the monitor 12, the user selects the images to be saved, and the specified image is saved in the recording device 106.

In step SP17, the recording control section 105 deletes (erases) all the image data in the temporary-save folder.

In this manner, from step SP15 to step SP17, the deletion processing of the left image data is performed, and all the image data in the temporary-save folder is deleted. By this means, the temporary-save folder can be made empty for each operation of the imaging apparatus 1A, and thus it becomes possible to effectively use the capacity of the image memory 103.

In step SP18, the power to the imaging apparatus 1A is turned off.

As described above, the imaging apparatus 1A includes: the imaging device acquiring a captured image on a subject; the monitor 12; the setting means for setting whether to make effective a temporary recording mode in which the captured image is temporarily recorded in a first storage section; if the temporary recording mode is effective, the display control section 104 for playback displaying the captured image recorded in the first storage section from when the temporary recording mode has been effective on the display section in response to an instruction operation of a user; and the recording control section 105 for recording an image specified by the user from the playback-displayed captured images in the recording device 106 as an image to be saved. Thus, the images to be saved are saved in the recording device 106. Accordingly, it is possible to reduce a troublesome operation of deleting unnecessary images from the images saved in the recording device 106. Also, it becomes difficult to save unnecessary images in the recording device 106, and thus it becomes possible to effectively use the storage area of the recording device 106.

Also, it is possible to determine the images to be saved for each operation (starting) of the imaging apparatus 1A assuming a period from turning-on the power to turning-off the power to the imaging apparatus 1A as one unit using the temporary save mode. Thus, it becomes possible to easily arrange the acquired captured images.

Also, in general, when using a digital camera, a user tends to perform shooting of a same subject a plurality of times without fearing failures, because it is easy to delete the shot images. Thus, it becomes highly probable that the captured images include a large number of unnecessary images for the user. Accordingly, it becomes easier for the user to select images to be saved rather than to select images to be deleted. That is to say, in the imaging apparatus 1A performing the operation of selecting images to be saved, it becomes possible for the user to more efficiently save the save-target images in the recording device 106.

2. Second Embodiment

An imaging apparatus 1B according to a second embodiment has the same configuration and functions as those of the imaging apparatus 1A according to the above-described first embodiment (refer to FIGS. 1, 2, and 3), and further has a function of limiting the capacity of the image data to be saved in the temporary-save folder of the image memory 103.

The recording control section 105 (FIG. 3) of the imaging apparatus 1B uses a capacity pre-set by the user's menu operation (also called a "set capacity"), etc., as an upper limit value, and controls to keep the capacity of the image data saved in the temporary-save folder equal to or less than the upper limit value.

Specifically, if the total capacity of the image data in the temporary-save folder exceeds the set capacity when new image data acquired by the imaging apparatus 101, etc., is stored in the temporary-save folder, the recording control section 105 automatically deletes a part of the image data already saved in the temporary-save folder ("already saved data") in the reverse order of priority (for example, in chronological order of the acquisition of image data).

By this means, if the total capacity of the image data in the temporary-save folder exceeds the set capacity, the recorded area in the temporary-save folder is released to be a recordable area, and thus it is possible to effectively use the recording area of the temporary-save folder.

3. Variations

A description has been given of embodiments of this embodiment. However, this invention is not limited to the above-described contents.

Figure 9:
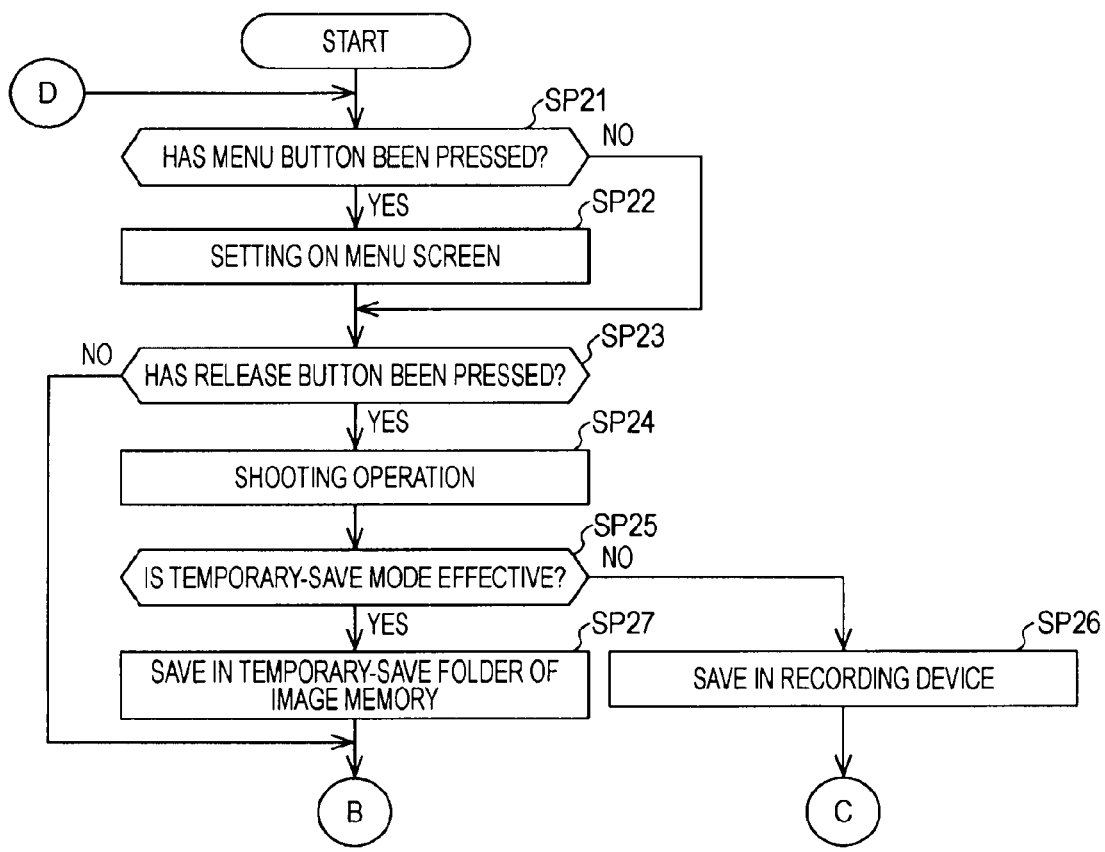
FIG. 9 is a flowchart illustrating an operation of an imaging apparatus according to a variation.
Figure 10:
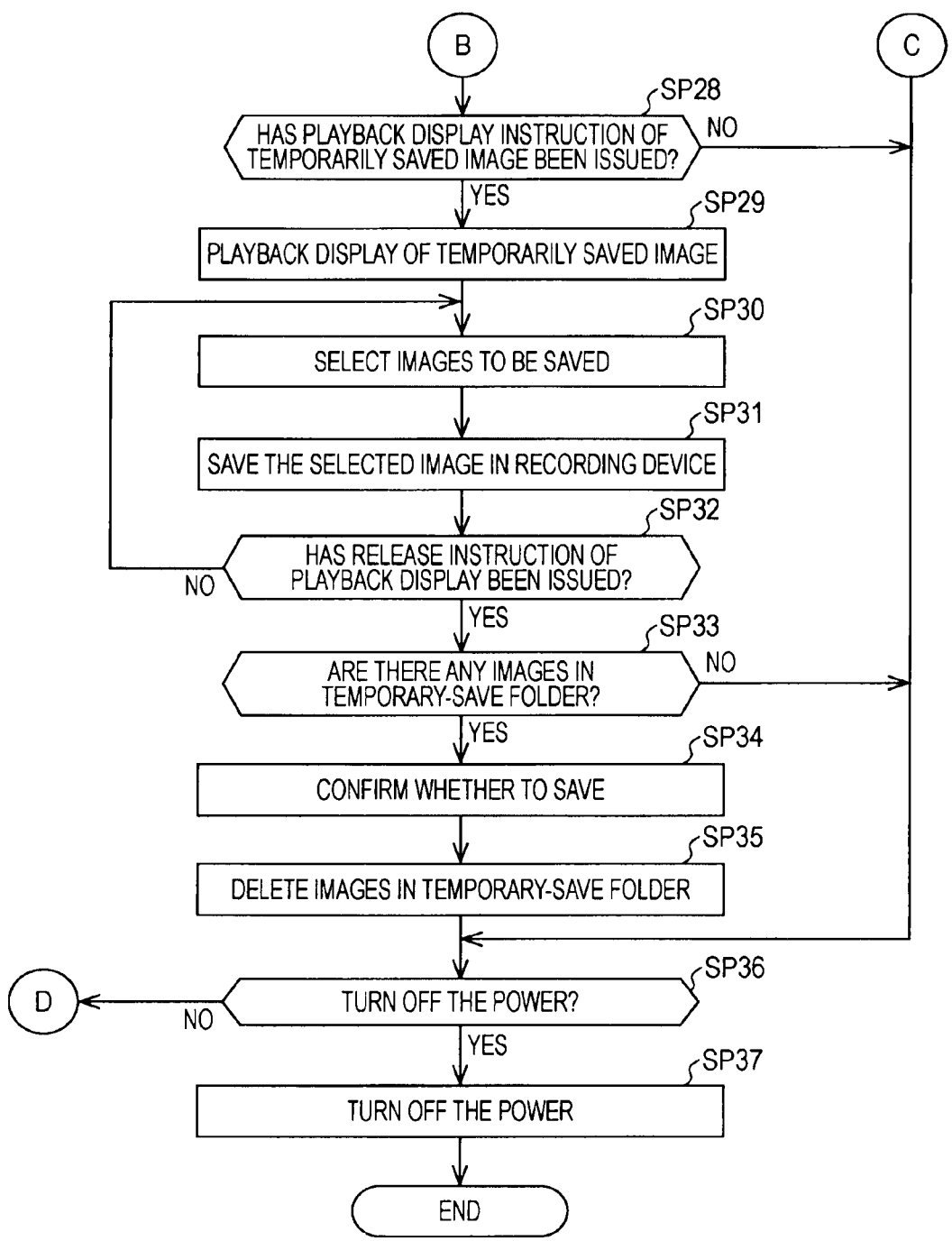
FIG. 10 is a flowchart illustrating an operation of the imaging apparatus according to the variation.

For example, in each of the above-described embodiments, the deletion processing of the left image data (from step SP15 to step SP17) is performed in response to the detection of the turn-off-power instruction of the imaging apparatus 1A (after the detection of the turn-off-power instruction). However, the deletion processing is not limited to this. FIGS. 9 and 10 are flowcharts illustrating an operation of an imaging apparatus 1C according to a variation.

Specifically, as shown in FIGS. 9 and 10, the deletion processing of the left image data (from step SP33 to step SP35) may be performed in response to the detection of the release instruction of the playback display (step SP32).

More specifically, from step SP21 to step SP32, after performing the same processing as the above-described steps SP1 to SP12, a determination is made on whether there is image data in the temporary-save folder in step SP33. If there is no image data, the processing proceeds to step SP36. Else if there is image data, the processing proceeds to step SP34.

In step SP34, a confirmation (saving confirmation) is made to the user on whether to perform the save operation of the image data in the temporary-save folder. If the user has selected to perform save operation, the temporarily saved image in the temporary-save folder is displayed on the monitor 12, and the user selects the images to be saved.

In step SP35, the recording control section 105 deletes all the image data in the temporary-save folder.

In step SP36, a determination is made on whether a turn-off-power instruction to the imaging apparatus 1C has been detected. If the turn-off-power instruction has not been detected (if the power-on state continues), the processing proceeds to step SP21, and in the imaging apparatus 1C, the processing from step SP21 to step SP36 is repeatedly performed until the turn-off-power instruction is detected. On the other hand, if the turn-off-power instruction is detected, the processing proceeds to step SP37. In step SP37, the power to the imaging apparatus 1C is turned off.

In this manner, the imaging apparatus 1C performs the deletion processing of the left image data in response to the detection of a release instruction of the playback display (step SP32).

Also, the deletion processing of the left image data (from step SP15 to step SP17) may be performed in response to an explicit deletion instruction from the user, such as a menu operation or the pressing operation of a deletion instruction button (not shown in the figure), etc.

Also, in each of the above-described embodiments, in a state of the temporary-save mode being effective, the captured image data is temporarily saved in the temporary-save folder of the image memory 103. However, the saving of the image data is not limited to this.

Specifically, a new folder may be created in the recording device 106, and the new folder may be a temporary-save folder. That is to say, in the imaging apparatus according to the variation, in a state of the temporary-save mode being effective, the captured image data is temporarily saved in the temporary-save folder of the recording device 106.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    an imaging device that acquires a captured image on a subject;
    a display device;
    a first storage device that temporarily records images;
    a graphical interface operable by a user for setting one of a temporary recording mode in which the captured image is temporarily recorded in the first storage device and a direct recording mode in which the captured image is directly recorded in a second storage device without being temporarily recorded in the first storage device;
    display control means for displaying on the display device the captured image temporarily recorded in the first storage device in response to a display instruction of the user;
    selection means operable by the user for selecting a selected image from the images temporarily recorded in the first storage device and displayed on the display device;
    recording control means for recording the selected image in the second storage device and deleting the selected image from the first storage device; and
    deletion means for deleting all of the images remaining in the first storage device after the selecting by the selection means, wherein the deleting of all the images remaining by the deletion means is carried out at once in response to an action instructed by the user.

2. The imaging apparatus according to claim 1, further comprising:
    off-instruction detecting means for detecting a power-off instruction by the user to power off the imaging apparatus,
    wherein the deletion means carries out the deleting in response to detection of the power-off instruction.

3. The imaging apparatus according to claim 1, further comprising:
    release-instruction detecting means for detecting a release instruction by the user to stop the displaying of the captured image temporarily recorded in the first storage device,
    wherein the deletion means carries out the deleting at once in response to detection of the release instruction.

4. The imaging apparatus according to claim 1, further comprising:
    deletion-instruction detecting means for detecting a deletion instruction by the user,
    wherein the deletion means carries out the deleting in response to detection of the deletion instruction.

5. The imaging apparatus according to claim 1, further comprising:

warning means for issuing a warning before the deletion means carries out the deleting if the captured image is still temporarily recorded in the first storage device.

6. The imaging apparatus according to claim 1, wherein if a recording area of the first storage device used for temporary recording becomes greater than a predetermined upper limit, the recording control means deletes a part of the captured images in the first storage device.

7. An imaging apparatus comprising:

an imaging device that acquires a captured image on a subject;

a display device;

a first storage device that temporarily records images;

a graphical interface operable by a user for setting one of a temporary recording mode in which the captured image is temporarily recorded in the first storage device and a direct recording mode in which the captured image is directly recorded in a second storage device without being temporarily recorded in the first storage device;

a display control mechanism that displays on the display device the captured image temporarily recorded in the first storage device in response to a display instruction of the user;

a selection mechanism operable by the user for selecting a selected image from the captured image temporarily recorded in the first storage device and displayed on the display device;

a recording control mechanism for recording the selected image in the second storage device and deleting the selected image from the first storage device; and a deletion mechanism for deleting all of the images remaining in the first storage device after the selecting by the selection mechanism, wherein the deleting of all the images remaining by the deletion mechanism is carried out at once in response to an action instructed by the user.

8. An imaging apparatus comprising:

an imaging device that acquires a captured image on a subject;

a display device;

a first storage device that temporarily records images;

a graphical interface operable by a user for setting one of a temporary recording mode in which the captured image is temporarily recorded in the first storage device and a direct recording mode in which the captured image is directly recorded in a second storage device without being temporarily recorded in the first storage device; and circuitry configured to control the display device to display the captured image temporarily recorded in the first storage device in response to a display instruction of the user, wherein the graphical user interface is operable by the user for selecting a selected image from the images temporarily recorded in the first storage device and displayed on the display device, the circuitry is configured to record the selected image in the second storage device and delete the selected image from the first storage device; and the circuitry is configured to delete all of the images remaining in the first storage device at once in response to an action instructed by the user after the selecting at the graphical user interface.

* * * * *